(12) United States Patent
Chandrasiri et al.

(10) Patent No.: US 11,877,612 B2
(45) Date of Patent: Jan. 23, 2024

(54) LATEX DIPPED ARTICLE WITH A MODIFIED POLYVINYL ALCOHOL LAYER WHICH RESIST TO WATER, SOLVENTS AND DILUTED SOLVENTS

(71) Applicant: DIPPED PRODUCTS PLC, Colombo (LK)

(72) Inventors: Rendage Sachini Sandeepa Chandrasiri, Colombo (LK); Pathirannehelage Dhammika Sameera Kulathilaka, Colombo (LK); Hasini Dinushika Dangalle, Colombo (LK); Upul Nishantha Ratnayake, Colombo (LK)

(73) Assignee: DIPPED PRODUCTS PLC, Colombo (LK)

( * ) Notice: Subject to any disclaimer, the term of this patent is extended or adjusted under 35 U.S.C. 154(b) by 455 days.

(21) Appl. No.: 17/307,222

(22) Filed: May 4, 2021

(65) Prior Publication Data

US 2021/0251319 A1    Aug. 19, 2021

Related U.S. Application Data

(63) Continuation-in-part of application No. PCT/IB2020/052199, filed on Mar. 12, 2020.

(30) Foreign Application Priority Data

Apr. 4, 2019 (LK) .......................... 20441

(51) Int. Cl.
*A41D 19/015* (2006.01)
*B29C 41/00* (2006.01)
(Continued)

(52) U.S. Cl.
CPC .......... *A41D 19/015* (2013.01); *B29C 41/003* (2013.01); *B29C 41/14* (2013.01);
(Continued)

(58) Field of Classification Search
CPC .............. A41D 19/015; A41D 2500/50; A41D 2500/54; A41D 19/0058; B29C 41/003;
(Continued)

(56) References Cited

U.S. PATENT DOCUMENTS 4,731,266 A    3/1988 Bonnebat et al.
5,649,326 A    7/1997 Richard, Jr. et al.
(Continued)

FOREIGN PATENT DOCUMENTS

| CN | 107955238 A | * | 4/2018 | .......... A41D 19/015 |
| EP | 2 441 337 A1 | | 4/2012 | |
| WO | 2005/002375 A1 | | 1/2005 | |

OTHER PUBLICATIONS

International Search Report for PCT/IB2020/052199 dated Jun. 4, 2020 (PCT/ISA/210).
(Continued)

*Primary Examiner* — Elizabeth M Imani
(74) *Attorney, Agent, or Firm* — Sughrue Mion, PLLC

(57) ABSTRACT

A glove is provided that includes an outer layer and an inner layer. The outer layer includes a polyvinyl alcohol (PVA) composite including PVA chemically modified with nano cellulose and pre cross linked nitrile latex. The inner layer includes nitrile latex.

20 Claims, 4 Drawing Sheets

Outer layer

Inner layer

(51) Int. Cl.
  *D06N 3/10* (2006.01)
  *D06N 3/00* (2006.01)
  *B29K 29/00* (2006.01)
  *B29C 41/14* (2006.01)
  *B29C 41/22* (2006.01)
  *B29D 99/00* (2010.01)
  *B29K 9/00* (2006.01)
  *C08F 16/06* (2006.01)
  *C08K 3/26* (2006.01)
  *C08K 3/34* (2006.01)

(52) U.S. Cl.
  CPC .......... *B29C 41/22* (2013.01); *B29D 99/0067* (2013.01); *D06N 3/0059* (2013.01); *D06N 3/0068* (2013.01); *D06N 3/103* (2013.01); *A41D 2500/50* (2013.01); *B29K 2005/00* (2013.01); *B29K 2009/00* (2013.01); *B29K 2029/04* (2013.01); *C08F 16/06* (2013.01); *C08K 3/26* (2013.01); *C08K 3/34* (2013.01); *D06N 3/0002* (2013.01); *D06N 2203/02* (2013.01); *D06N 2203/045* (2013.01); *D06N 2205/10* (2013.01); *D06N 2209/142* (2013.01); *D06N 2211/103* (2013.01); *Y10T 442/2057* (2015.04)

(58) Field of Classification Search
  CPC ..... B29C 41/14; B29C 41/22; B29D 99/0067; D06N 3/0059; D06N 3/0068; D06N 3/103; D06N 3/0002; D06N 2203/02; D06N 2203/045; D06N 2205/10; D06N 2209/142; D06N 2211/103; B29K 2005/00; B29K 2009/00; B29K 2029/04; C08F 16/06; C08K 3/26; C08K 3/34; Y10T 442/2057; C08L 9/04; C08L 29/04; C08L 7/00
  See application file for complete search history.

(56) References Cited

U.S. PATENT DOCUMENTS

2007/0254160 A1* 11/2007 Kravitz .................. B32B 27/40
  427/407.1
2012/0055642 A1    3/2012  Lahtinen

OTHER PUBLICATIONS

Written Opinion for PCT/IB2020/052199 dated Jun. 4, 2020 (PCT/ISA/237).

* cited by examiner

(12) United States Patent
US 11,877,612 B2

LATEX DIPPED ARTICLE WITH A MODIFIED POLYVINYL ALCOHOL LAYER WHICH RESIST TO WATER, SOLVENTS AND DILUTED SOLVENTS

CROSS-REFERENCE TO RELATED APPLICATION(S)

This application is a continuation-in-part of International Application No. PCT/IB2020/052199 filed on Mar. 12, 2020, which is based on and claims priority from Sri Lankan Application No. 20441, filed in the Sri Lankan Patent Office on Apr. 4, 2019, the entire contents of each of which are herein incorporated by reference in their entireties.

BACKGROUND

1. Field

The present disclosure relates to a nitrile glove with a modified polyvinyl alcohol (PVA) layer.

2. Description of Related Art

Personal Protective Equipment's (PPE) are essential to conduct any work in a safer manner. PPE includes gloves, helmets, etc. Among PPE, a top priority is given to chemical protection gloves which protect hands from hazardous chemicals. There are many gloves in the market which are made of natural rubber, acrylonitrile butadiene rubber (NBR), polychloroprene rubber, etc. Chemical protection gloves may include, for example, natural rubber gloves and nitrile and polychloroprene latex gloves.

Natural rubber gloves are generally resistant to polar solvents. Nitrile and polychloroprene latex gloves are mostly suitable for oxidizing acids and bases in addition to certain polar and non-polar solvents. However natural rubber gloves and nitrile and polychloroprene latex gloves are not resistant to certain organic solvents, specially ketones, and other special solvents such as chlorinated solvents and amines. In addition all polyvinyl alcohol (PVA) coated chemical resistant gloves are fabric supported gloves. Though PVA coated gloves provide promising protection against ketones and other organic solvents, PVA coated gloves do not resist water and diluted solvents due to the inherent nature of water solubility. As a result, PVA coated supported gloves should always be prevented from contact with water. In addition, chemical performances of PVA coated gloves are drastically reduced under high humid conditions due to the absorption of atmospheric moisture by the PVA layer and therefore PVA coated gloves have to be stored in a moisture free environment to retain the chemical performances.

U.S. Pat. No. 4,731,266 describes a method of preparing a thin polyvinyl alcohol film which are gelled, non-tacky, bubble-free and resistant to water at ambient temperatures. The main focus of U.S. Pat. No. 4,731,266 is to provide composite, biaxially oriented, impermeable barrier layer coated thermoplastic hollow shaped articles useful as packaging material, e.g. as packages and bottles for flavored foods and carbonated beverages.

U.S. Pat. No. 5,649,326 describes a flexible hydrophilic coating for orthopedic casting gloves and method of making such gloves. The lubricous glove is made of a base material having a coating thereon of a hydrophilic lubricant mixed with a substantial portion of the material of the base material. For an example, a natural rubber latex glove may have coated thereon a mixture of natural rubber latex and polyvinyl alcohol in order to provide a lubricous surface. The glove may be made of a mixture of the flexible base material and the hydrophilic lubricant example is natural rubber latex mixed with either polyvinyl alcohol, polyvinyl pyrrollidone or polyethylene oxide and a glove formed from the mixture in order to provide a lubricous glove.

U.S. Patent Application No. 2012/0055642A1 concerns a paper or board product with an improved tensile strength comprising cellulose fibers, one or more zirconium carbonate compound(s) and water-insoluble polyvinyl alcohol fibers, and a process for manufacturing such a product, comprising the steps of forming a combined aqueous suspension of cellulose fibers and water insoluble polyvinyl alcohol fibers, and pressing it into a paper or board product, or pressing layers of water-insoluble polyvinyl alcohol fibers and cellulose fibers into a product having a sandwich-structure, and treating the product before drying with an aqueous solution of a zirconium carbonate compound by impregnating one or more of the surfaces of the product or the complete product with the solution.

However, most of the polyvinyl alcohol (PVA) coated gloves are fabric supported versions which are bulky and less comfortable, and are not appropriate for high humidity conditions or for use with diluted solvents.

SUMMARY

It is an aspect to provide glove or latex dipped article having improved resistance to permeation of a range of chemicals for use in high humidity conditions and with diluted solvents.

According to an aspect of one or more embodiments, there is provided a glove comprising an outer polyvinyl alcohol (PVA) layer comprising zirconium carbonate, layered silicates, nano cellulose and a pre cross linked nitrile latex; and an inner layer comprising nitrile latex, antidegradants, stabilizers, viscosity modifiers, pigments and a curing system comprising an accelerator, sulfur and zinc oxide.

According to another aspect of one or more embodiments, there is provided a glove comprising an outer layer comprising a polyvinyl alcohol (PVA) composite including PVA chemically modified with nano cellulose and pre cross linked nitrile latex; and an inner layer comprising nitrile latex.

BRIEF DESCRIPTION OF DRAWINGS

The above and other aspects will be more clearly understood from the following detailed description, taken in conjunction with the accompanying drawings, in which.

DETAILED DESCRIPTION

Most of the polyvinyl alcohol (PVA) coated gloves in the market are fabric supported versions which are bulky and less comfortable. By contrast, in gloves according to various embodiments described herein, the water soluble/hydrophilic PVA layer is chemically modified in such a way to make the PVA layer hydrophobic and as a result the glove is less vulnerable to degradation when in contact with water. With this new development, the glove may be used with diluted solvents (i.e. especially ketones and water mixtures) and under high humidity conditions.

According to various embodiments, a glove described herein may be an unsupported glove with a thickness of about 0.28 mm and with a good flexibility and dexterity with an enhanced protection towards organic solvents which includes aliphatic and aromatic hydrocarbons, chlorinated solvents, amines, ketones, etc. and more importantly diluted solvents.

According to various embodiments, there is provided an unsupported nitrile glove with a modified PVA layer with a thickness of about 20 μM which imparts hydrophobicity to the glove and as a result resistant towards most of harsh chemicals, solvents, diluted solvents, water.

Hereinafter, various embodiments will be described with reference to the accompanying drawings.

Various embodiments relate to a latex dipped article, particularly a latex glove with multiple layers comprising PVA. The inner layer may be made of nitrile latex while the outer layers have a combination of materials composed of PVA, layered silicates favorably laponite, zirconium carbonate, nano cellulose and pre crosslinked nitrile latex. PVA which is inherently soluble in water is modified with the incorporation of nanocellulose and pre cross linked nitrile latex so that the outer layer made out of PVA will resist against water and will not degrade when exposed to diluted solvents.

Glove Structure—Structure of Unlined/Unsupported Glove

Figure 1:
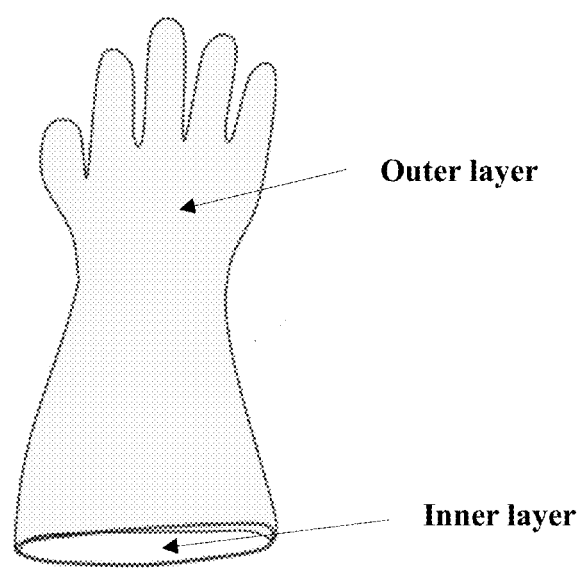
FIG. 1 is an example of a glove structure, according to an embodiment.

FIG. 1 illustrates an example of a glove structure, according to an embodiment. The glove may include an inner layer and at least one outer layer. The glove is made of elastomeric composite layers where the inner layer is made of nitrile latex and the at least one outer layer is made of poly vinyl alcohol. The glove is made with two objectives, firstly to make a glove that resists water and secondly to make the glove to be used with diluted solvents (targeting acetone/water mixture).

Outer layer may be made of PVA including layered silicate, favorably laponite, zirconium carbonate, nano cellulose and nitrile latex.

Inner layer may be made of nitrile latex as the main elastomer including other chemicals such as cross linking agents, for example, sulphur, accelerators, zinc oxide, viscosity modifiers, pigments and anti-oxidants.

Outer Modified PVA Layer

The outermost layer of the glove is made of chemically modified PVA composite where the layer will not dissolve in the presence of water or solvent-water mixtures. PVA, an inherently water soluble material, is chemically modified by adding nano cellulose and pre crosslinked nitrile latex so that the PVA layer will not be soluble in water. The PVA composite is made of fully hydrolyzed PVA, zirconium carbonate, layered silicate, preferably laponite, nano cellulose, color pigments, anti-foaming agents and pre crosslinked nitrile latex.

The nitrile latex is pre cross linked with a carbodiimide cross linker which is a liquid in nature and will prevent formation of holes in the outer PVA layer due to presence of dispersion pieces. Zirconium carbonate helps to increase the degree of crosslinking, by reacting with the OH (Hydroxyl) groups in the PVA and acts as a binder to form strong crosslinks while the layered silicate/laponite helps in film forming. The crosslinks formed between PVA, nanocellulose and zirconium carbonate provides water resistivity by reducing the available OH groups in the outer PVA layer to react with water. This is further improved by pre cross linked nitrile latex present in the composition, which will act as a barrier for solvent molecules to pass through the glove.

The main ingredient PVA provides excellent permeation resistance towards organic solvents which includes aliphatic and aromatic hydrocarbons, chlorinated solvents, amines, and specially ketones like acetone and MEK.

Inner Nitrile Layer

The inner layer of the glove is made of nitrile (NBR) latex which provides protection for aliphatic hydrocarbons, acids and bases. For the inner layer natural rubber latex, polychloroprene, and blends of NBR, natural rubber and polychloroprene, or any other rubbers, SBR, butyl, PVC, and synthetic poly isoprene may be used.

In addition to latex, the inner nitrile layer contains one or more additives, such as wetting agents, stabilizers, curing agents, viscosity modifiers and pigments.

Structure of Fabric Supported Glove

Similar to the unlined/unsupported glove described above, a fabric supported glove may include an inner most layer that contacts the skin, an inner layer, and at least one outer layer. The fabric supported glove may be made of elastomeric composite layers, where the inner layer is made of nitrile latex and the at least one outer layer made of poly vinyl alcohol. As the skin contacting inner most layer, a fabric liner with the shape of the hand is used. The fabric liner includes a material comprising natural and synthetic yarns including but not limited to cotton, wool, polyester, rayon, nylon, acrylic, spandex, nylon 6, nylon 66, para and meta aramids such as Kevlar, ultra-high molecular weight polyethylene, high-performance polyethylene (HPPE), or any blend of these natural and synthetic yarns. The nitrile layer is deposited on the fabric liner and, similar to the unsupported version, the outer PVA layer is then coated on top of the nitrile layer.

Glove Making Process

Figure 2:
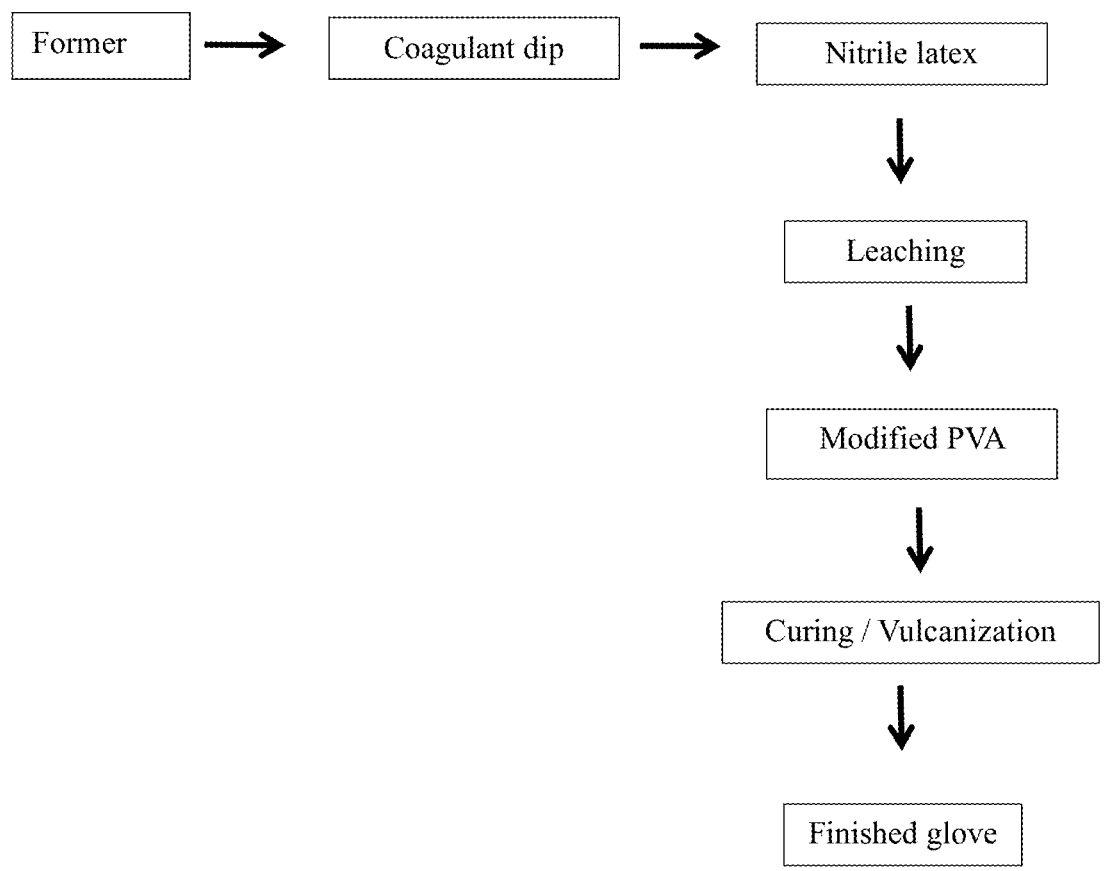
FIG. 2 is an example of a glove making process, according to an embodiment.

FIG. 2 is an example of a glove making process, according to an embodiment. The glove is made by a dipping process for manufacturing of the glove as follows.

Coagulant Dipping

As the initial step, a hot former is dipped in a coagulant bath (e.g., calcium nitrate) which will facilitate the formation of a nitrile film. In the fabric supported glove, prior to applying the coagulant, a fabric liner is dressed to the hot former and then the coagulant is applied.

Nitrile Latex Dipping

The former is then dipped in a nitrile latex which will form a thin layer of nitrile on top of the former. For example, the process may be a film formation or gelation process.

Leaching

The former is leached in water at a temperature of approximately 50 degrees Celsius (° C.) to remove excess calcium nitrate and water soluble materials in the nitrile latex layer.

Modified PVA Layer Dip

The leached former is then dipped in the modified PVA. In some embodiments, multiple dips may be performed. In some embodiments, two dips are given to ensure uniform coating of the modified PVA layer on top of the nitrile latex film.

Curing/Vulcanization
a vulcanization process is then performed in which the nitrile latex, PVA layers are crosslinked to increase the elasticity and the strength of the final product.
Stripping
The finished gloves are stripped from the glove formers manually. Alternatively, the finished gloves may be stripped from the glove formers using a machine.

Chemical Permeation Performance of the Glove

The performance of the glove, made as described above, for chemical permeation was measured according to the EN ISO 374-1:2016 Standard and the results are provided in Table 1 below.

TABLE 1

Chemical Resistance of a Glove with Modified PVA Layer

| Solvent | Permeation level according to EN ISO 374-1:2016 | Break through time (min) |
| --- | --- | --- |
| Water 50:Acetone 50 | 3 | 92 |
| Methanol | 2 | 56 |
| Acetone | 6 | >480 |
| Dichloromethane | 6 | >480 |
| Diethyl ether | 6 | >480 |
| Ethyl acetate | 6 | >480 |
| MEK | 6 | >480 |
| n-hexane | 6 | >480 |
| n-heptane | 6 | >480 |
| Toluene | 6 | >480 |
| Xylene | 6 | >480 |

According to Table 1, level three and two performance values have been achieved for diluted solvents and methanol respectively while maintaining consistent level 6 permeation resistance for other solvents such as acetone, dichloromethane, diethyl ether and etc.

Performance of the Modified PVA Layer Towards Water

The resistance of the modified PVA layer towards water was compared with the unmodified PVA layer by measuring in two ways, under high humidity conditions and with direct exposure to water.

Performance of the Modified PVA Layer Under Direct Contact with Water

Figure 3:
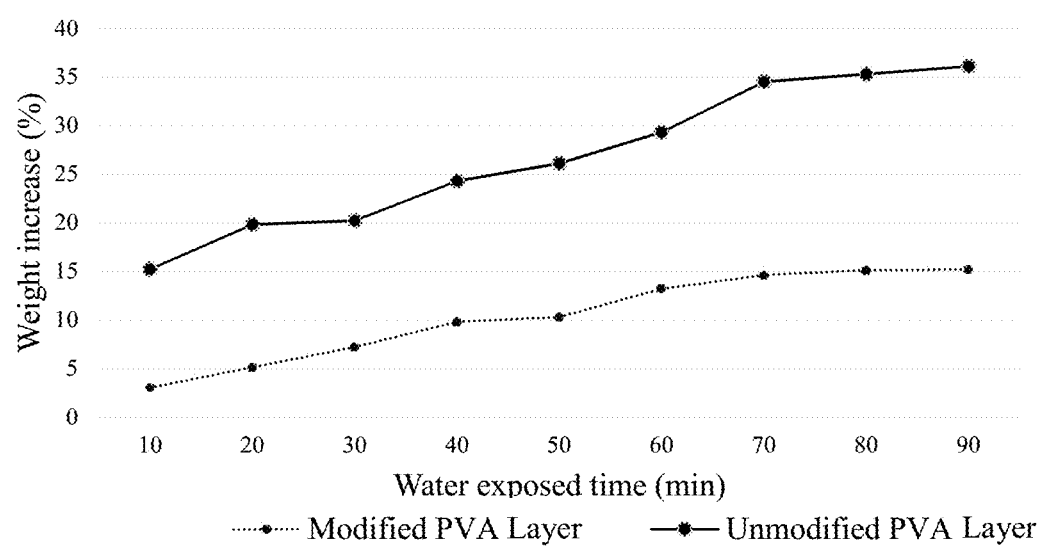
FIG. 3 is a graph illustrating a weight increment of gloves with modified and unmodified polyvinyl alcohol (PVA) layer after direct contact with water.

FIG. 3 is a graph illustrating a weight increment of gloves with modified and unmodified PVA layer after direct contact with water. The water resistance against direct water contact was measured by exposing known weight of glove pieces prepared separately with modified and unmodified PVA layers for a time period of one and half hours. The obtained results of weight increase were plotted against the exposed time and FIG. 3 indicates the respective results. According to the obtained results, the modified PVA layer has higher resistance towards water absorption compared to unmodified PVA layer.

Performance of the Modified PVA Layer Under High Humidity Conditions

Figure 4:
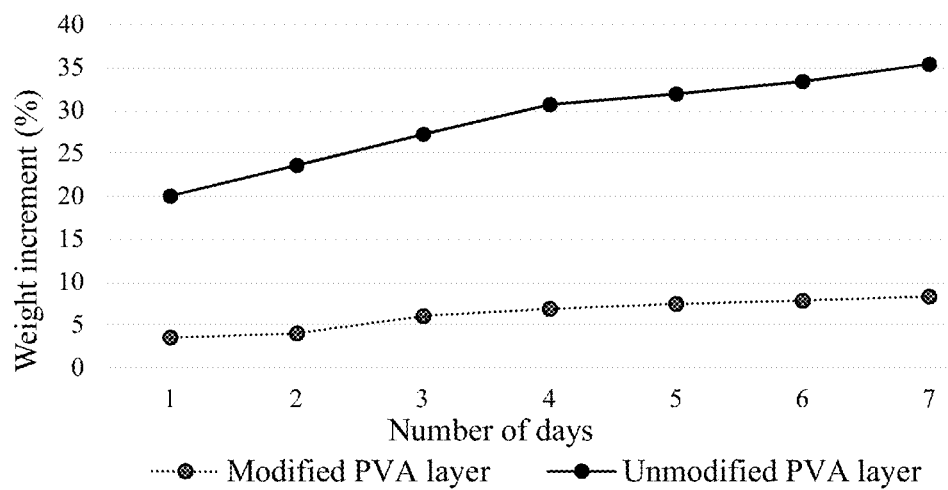
FIG. 4 is a graph illustrating a percentage weight increment of gloves made with a modified and unmodified PVA layer under high humid conditions.

FIG. 4 is a graph illustrating a percentage weight increment of gloves made with a modified and unmodified PVA layer under high humid conditions. To evaluate the water absorption under high humidity conditions, trials were performed with gloves made of modified and unmodified PVA. Gloves with modified and unmodified PVA layers were placed in a humid chamber and the moisture absorption was measured as percentage weight increment for a period of seven days. The obtained results are plotted in FIG. 4 which clearly indicates the modified PVA layer has high resistance towards water absorption under high humid conditions compared to unmodified PVA layer.

According to various embodiments, a multi layered chemical resistant glove or latex dipped article is provided that has multiple layers comprising synthetic latex and polyvinyl alcohol (PVA) layer cross linked with zirconium carbonate. The combination of these materials enables the dipped article to resist the permeation of a range of chemicals, ranging from non-polar solvents to polar solvents. The polyvinyl alcohol layer which is inherently hydrophilic is further modified to convert the polyvinyl alcohol layer into hydrophobic, so that the multi layered chemical resistant glove or latex dipped article may be used in high humidity conditions and with diluted solvents (solvent water mixtures).

For example, according to various embodiments, an unlined/unsupported multi layered chemical resistant glove comprises a PVA outer layer comprising zirconium carbonate, layered silicates, nano cellulose and pre cross linked nitrile latex, and an inner layer consisting of nitrile latex, antidegradants, stabilizers, viscosity modifiers, pigments and standard curing system comprising accelerator, sulfur and zinc oxide.

The outer layer may comprise a fully hydrolyzed water insoluble PVA layer which does not degrade upon direct water contact or in high humid conditions.

The layered silicate may be of laponite, montmorillonite, hectorite or saponite.

The pre crosslinked nitrile latex may be pre cross linked with a carbodiimde cross linker or other cross linking agents such as sulphur and zinc oxide.

The outer PVA layer may comprise a three dimensional crosslinks made in between PVA, nanocellulose and zirconium carbonate which provides water resistivity by reducing the available OH groups in the outer PVA layer to react with water.

The three dimensional crosslinks may be further improved by pre cross linked nitrile latex which will act as a barrier for solvent molecules to pass through the glove.

The inner layer may comprise elastomers like nitrile, natural rubber latex, polychloroprene, blends of polychloroprene or any other rubbers, SBR, butyl, PVC, and synthetic poly isoprene.

The PVA outer layer may have a thickness in the range 10-50 μM.

The cured article may provide a break through time of 480 minutes (level 6) performance for acetone and break through time of 92 minutes (level 3) performance for water:acetone 50:50 mixture according to EN ISO 374-1: 2016 standard.

The article may also be a fabric supported glove with a modified PVA outer and inner of nitrile latex layer.

According to various embodiments, an unlined/unsupported multi layered chemical resistant glove may comprise a PVA outer layer comprising zirconium carbonate, layered silicates, nano cellulose and pre cross linked nitrile latex; and an inner layer comprising nitrile latex, antidegradants, stabilizers, viscosity modifiers, pigments and standard curing system comprising accelerators, sulfur and zinc oxide.

The PVA outer layer of the unlined/unsupported multi layered chemical resistant glove may comprise a fully hydrolyzed water insoluble PVA layer which does not degrade upon direct water contact or in high humid conditions.

The layered silicate in the PVA outer layer of unlined/unsupported multi layered chemical resistant glove may be of laponite, montmorillonite, hectorite or saponite.

The pre crosslinked nitrile latex in the PVA outer layer of unlined/unsupported multi layered chemical resistant glove may be pre cross linked with a carbodiimide cross linker or other cross-linking agents such as sulphur and zinc oxide.

The outer PVA layer of the unlined/unsupported multi layered chemical resistant glove may comprise a three-dimensional crosslinks made in between PVA, nanocellulose and zirconium carbonate which provides water resistivity by reducing the available hydroxyl OH groups in the outer PVA layer to react with water.

The three-dimensional crosslinks in the outer PVA layer of unlined/unsupported multi layered chemical resistant glove may be further improved by pre cross linked nitrile latex which will act as a barrier for solvent molecules to pass through the glove.

The inner layer of unlined/unsupported multi layered chemical resistant glove may comprise elastomers like nitrile latex, natural rubber latex, polychloroprene, blends of polychloroprene or any other elastomer, rubbers, SBR, butyl, PVC, and synthetic poly isoprene.

The PVA outer layer of the unlined/unsupported multi layered chemical resistant glove article have a thickness in the range 10-50 µm.

The cured unlined/unsupported multi layered chemical resistant glove article may comprise a fully hydrolyzed water insoluble PVA outer layer comprising polyvinyl alcohol in combination with nanocellulose, zirconium carbonate and pre crosslinked nitrile latex. The three dimensional crosslinks made within the PVA outer layer reduces the hydroxyl groups of polyvinyl alcohol to react with water and acts as a barrier for solvent molecules to pass through the glove. This results higher resistance towards water absorption, providing provides a break through time of 480 minutes (level 6) performance for acetone and break through time of 92 minutes (level 3) performance for water:acetone 50:50 mixture according to the EN ISO 374-1: 2016 standard.

The glove may be a fabric supported glove with a modified PVA outer and inner of nitrile latex layer.

While various embodiments have been illustrated and described above, it will be apparent to those skilled in the art that modifications and variations could be made without departing from the scope defined by the appended claims.

What is claimed is:

1. A glove comprising:
   an outer polyvinyl alcohol (PVA) layer comprising zirconium carbonate, layered silicates, nano cellulose and a pre cross linked nitrile latex; and
   an inner layer comprising nitrile latex, antidegradants, stabilizers, viscosity modifiers, pigments and a curing system comprising an accelerator, sulfur and zinc oxide.

2. The glove as claimed in claim 1, wherein the outer PVA layer comprises a fully hydrolyzed water insoluble PVA layer which does not degrade upon direct water contact or in high humidity conditions.

3. The glove as claimed in claim 1, wherein the layered silicates comprise laponite, montmorillonite, hectorite or saponite.

4. The glove as claimed in claim 1, wherein the pre crosslinked nitrile latex is pre cross linked with a carbodiimde cross linker or cross linking agents.

5. The glove as claimed in claim 4, wherein the pre crosslinked nitrile latex is pre cross linked with the cross linking agents, and the cross linking agents are sulphur and zinc oxide.

6. The glove as claimed in claim 1, wherein the outer PVA layer comprises three dimensional crosslinks made among the PVA, the nanocellulose and the zirconium carbonate, the three dimensional crosslinks providing water resistivity by reducing the available hydroxyl groups in the outer PVA layer to react with water.

7. The glove as claimed in claim 6, wherein the three dimensional crosslinks comprise a pre cross linked nitrile latex which acts as a barrier for solvent molecules to pass through the glove.

8. The glove as claimed in claim 1, wherein the inner layer comprises elastomers.

9. The glove as claimed in claim 8, wherein the elastomers include one or more of nitrile, natural rubber latex, polychloroprene, blends of nitrile, natural and polychloroprene, rubbers, SBR, butyl, PVC, and synthetic poly isoprene.

10. The glove as claimed in claim 1, wherein the outer PVA layer has a thickness in the range 10 µm to 50 µm.

11. The glove as claimed in claim 1, wherein the glove provides a break through time of 480 minutes for acetone and a break through time of 92 minutes for a 50:50 mixture of water:acetone.

12. The glove as claimed in claim 1, further comprising a fabric inner most layer that supports the inner layer.

13. A glove comprising:
    an outer layer comprising a polyvinyl alcohol (PVA) composite including PVA chemically modified with nano cellulose and pre cross linked nitrile latex; and
    an inner layer comprising nitrile latex.

14. The glove as claimed in claim 13, wherein the outer layer does not degrade upon direct water contact or in high humidity conditions.

15. The glove as claimed in claim 13, wherein the PVA composite comprises fully hydrolyzed PVA, zirconium carbonate, a layered silicate, the nano cellulose, color pigments, at least one anti-foaming agent, and the pre crosslinked nitrile latex.

16. The glove as claimed in claim 15, wherein the layered silicates comprise one or more of laponite, montmorillonite, hectorite and saponite.

17. The glove as claimed in claim 13, wherein the pre crosslinked nitrile latex is pre cross linked with a carbodiimide cross linker or is pre cross linked with Sulphur and zinc oxide.

18. The glove as claimed in claim 13, wherein the outer PVA layer comprises three-dimensional crosslinks made among the PVA, the nanocellulose and zirconium carbonate.

19. The glove as claimed in claim 13, wherein the outer layer has a thickness of about 10 µm to 50 µm.

20. The glove as claimed in claim 13, further comprising an inner most fabric layer.

* * * * *